W. Gardner,

Enameling Picture Frames.

No. 672. Reissued Mar. 15, 1859.

Witnesses:
L. L. Hardy
John T. Willard

Inventor:
William Gardner

AM. PHOTO-LITHO. CO. N.Y. (OSBORNE'S PROCESS)

UNITED STATES PATENT OFFICE.

WILLIAM GARDNER, OF NEW YORK, N. Y.

IMPROVEMENT IN MACHINERY FOR PREPARING OVAL PICTURE-FRAMES.

Specification forming part of Letters Patent No. 21,192, dated August 17, 1858; Reissue No. 672, dated March 15, 1859.

*To all whom it may concern:*

Be it known that I, WILLIAM GARDNER, of the city, county, and State of New York, have invented a new and useful Improvement in Machinery for Preparing Oval Picture-Frames; and I do hereby declare the following to be a full, clear, and exact description of the same, reference being had to the accompanying drawings, and to the letters of reference marked thereon.

My invention relates to machinery for laying onto wooden or other bodies of picture-frames the coats of cement necessary for forming the ground-work for the gilding; and my improvement consists in a combination of a lathe the face-plate of which is caused to traverse in an oval path, with a scraper formed to coincide with the desired molding, said scraper being self-adjusting laterally, as fully described hereinafter, so that it may accommodate itself to any irregular motion of the frame caused by the latter being placed, between the intervals allowed for the drying of the several coats of cement, in such a position on the face-plate of the lathe as not to coincide with the oval path of the said face-plate.

In order to enable others to make and use my invention, I will now proceed to describe the manner in which I carry it into effect.

Figure 1:
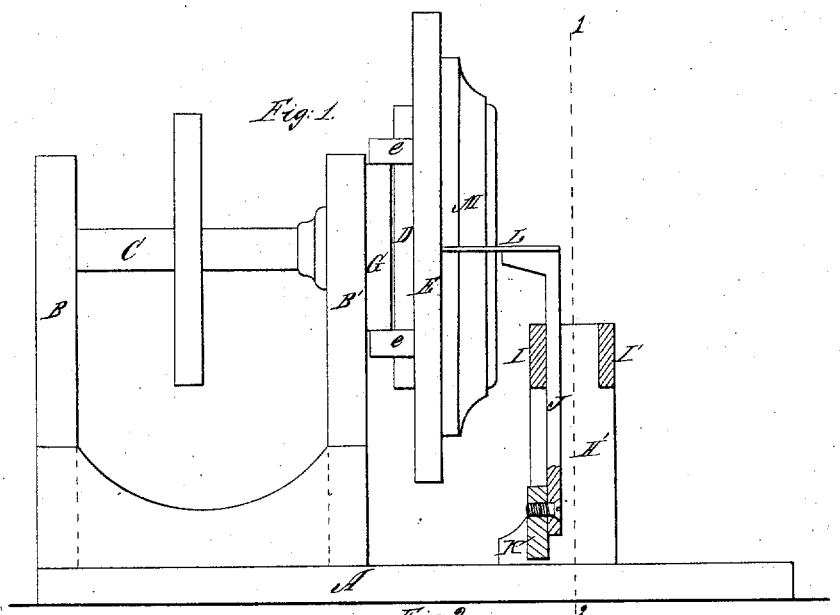
Figure 2:
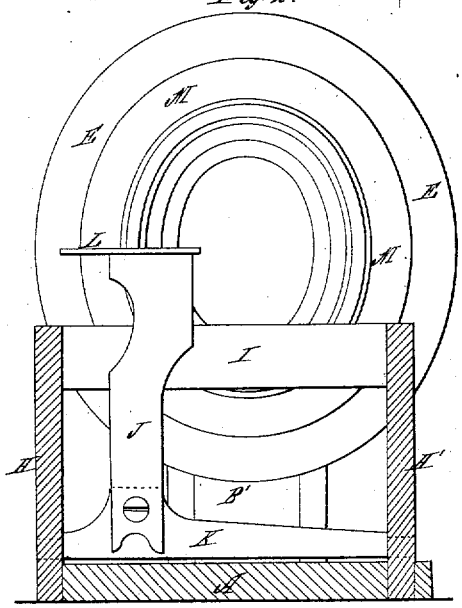
Figure 3:
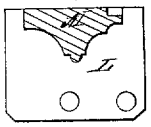

On reference to the accompanying drawings, which form a part of this specification, Figure 1 is a side view, partially in section, of my machine for preparing oval picture-frames; Fig. 2, a transverse section on the line 12, Fig. 1; Fig. 3, a plan view of the self-adjusting scraper.

A is the base of the machine, to which are secured the two uprights B and B′ for the spindle C.

E is the face-plate, having at the back permanent projections *e e*, which are arranged to fit over and slide freely on the bar D. Between the projections *e e*, and secured to the face of the upright B′ is a disk, G, situated eccentrically with the center of the spindle C.

As the parts above described have been heretofore used in connection with lathes for turning oval objects, a further description of their construction and operation will be unnecessary.

In front of the face-plate, and at a suitable distance from the same, are erected the two uprights H and H′, which are connected together at the top by the transverse bars I and I′. Between the latter is situated the arm J, which is jointed at the bottom to the rock-shaft K, the ends of which are allowed to turn freely in the opposite uprights H and H′. The top of the arm J is furnished with a thin metal plate, L, one edge of which is so cut out as to coincide with the form of the molding of the frame M, the latter being attached to the face-plate E.

The term "preparing," as applied to picture-frames by those engaged in their manufacture, signifies the covering of the wooden body of the frame with a preparation of whiting and glue, which forms the ground-work for the gilding; and it is necessary that this ground-work should be as smooth and uniform as possible.

The preparation of oval picture-frames has hitherto been a tedious process of manipulation, and has usually been accomplished by laying the wooden body on a table and applying the mixture while in a semi-fluid state by means of a brush. When one coat has been thus laid on, it is allowed to dry, when a second coating is applied and this allowed to dry, the operation being repeated until the desired thickness of preparation has been deposited on the frame. The surface is then rubbed down by means of pumice-stone, the pieces being adapted to the form of the different members of the molding, when the frame is thoroughly dried, ready to receive the gilding.

It will be readily seen that this operation is one of so tedious a nature as to render oval picture-frames costly articles of ornament. It is a difficult matter, too, when preparing oval picture-frames by hand to make the moldings of any two frames exactly alike and uniform. By my improvement the preparation of oval frames may be accomplished with great rapidity, as it is only necessary to attach the frame temporarily to the face-plate of the above-described lathe to lay on the preparation when the frame is in motion, and to apply the scraper L. When one coat has been thus laid on, the frame may be removed and another operated on in a similar manner. When dry, the operation may be repeated until the required thickness of preparation is deposited on the frame, and the desired smoothness and uniformity of surface attained.

After several removals of the oval frames from the face-plate it is almost impossible to replace them in their proper positions in order that they may revolve with accuracy. This difficulty is obviated by my improvement, for, even should the frame be attached to the face-plate considerably out of truth with the latter, the scraper I must accommodate itself to the irregularity of the movement, inasmuch as the arm J, to which the scraper is attached, is so jointed to the rock-shaft K that it can move freely backward and forward laterally with the frame; and, as the rock-shaft is allowed to turn freely in the uprights, the scraper can as easily be moved from and toward the molding of the frame, and this movement may be effected either by the hand of the attendant or by any suitable arrangement of springs.

It will now be seen without further explanation that by the above-described mode of preparing oval picture-frames perfect accuracy and uniformity of surface must be imparted to the moldings, and that in a series of frames intended to correspond with each other the moldings of all must be exactly alike, and this although the frames, after the drying of each successive coating of cement, are not placed on the face-plate so as to coincide exactly with the oval path in which it turns.

I claim, as a means of preparing oval picture-frames, and desire to secure by Letters Patent—

A lathe with a face-plate revolving in an oval path, in combination with a scraper adapted to the form of the desired molding of the oval frame, when the said scraper is so arranged as to be self-adjusting laterally with the said molding, substantially as and for the purpose herein set forth.

In testimony whereof I have signed my name to this specification in the presence of two subscribing witnesses.

WILLIAM GARDNER.

Witnesses:
JOHN S. WILLARD,
JAS. LANGLEY.